United States Patent
Kim et al.

(10) Patent No.: US 10,673,036 B2
(45) Date of Patent: Jun. 2, 2020

(54) BATTERY PACK

(71) Applicant: LG CHEM, LTD., Seoul (KR)

(72) Inventors: Hyeon-Kyu Kim, Daejeon (KR); Jae-Jung Seol, Daejeon (KR); Bum-Hyun Lee, Daejeon (KR); In-Jae Gang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/578,945

(22) PCT Filed: Jan. 6, 2017

(86) PCT No.: PCT/KR2017/000214
§ 371 (c)(1),
(2) Date: Dec. 1, 2017

(87) PCT Pub. No.: WO2017/119775
PCT Pub. Date: Jul. 13, 2017

(65) Prior Publication Data
US 2018/0175341 A1     Jun. 21, 2018

(30) Foreign Application Priority Data
Jan. 8, 2016 (KR) .................. 10-2016-0002620

(51) Int. Cl.
*H01M 2/10* (2006.01)
*H01M 2/16* (2006.01)
(52) U.S. Cl.
CPC ....... *H01M 2/1077* (2013.01); *H01M 2/1005* (2013.01); *H01M 2/1083* (2013.01); *H01M 2/16* (2013.01); *H01M 2220/20* (2013.01)

(58) Field of Classification Search
CPC .................................................. H01M 2/1005
See application file for complete search history.

(56) References Cited

U.S. PATENT DOCUMENTS

| | | | | |
|---|---|---|---|---|
| 4,013,819 A | * | 3/1977 | Grabb | H01M 2/1005 429/187 |
| 2004/0175609 A1 | * | 9/2004 | Yageta | H01M 2/0202 429/82 |
| 2008/0182163 A1 | * | 7/2008 | Xiao | H01M 2/1066 429/100 |
| 2011/0003196 A1 | * | 1/2011 | Kim | H01M 2/0404 429/179 |

(Continued)

FOREIGN PATENT DOCUMENTS

CN     204067462 U     12/2014
CN     204792929 U     11/2015

(Continued)

OTHER PUBLICATIONS

International Search Report, issued in PCT/KR2017/000214, dated Apr. 27, 2017.

*Primary Examiner* — Brian R Ohara
(74) *Attorney, Agent, or Firm* — Birch, Stewart, Kolasch & Birch, LLP

(57) ABSTRACT

Provided is a battery pack. The battery pack according to an embodiment of the present disclosure includes: a battery module including a plurality of battery cells; a case accommodating a plurality of the battery modules; and a handle rod embedded in the case.

10 Claims, 7 Drawing Sheets

(56) References Cited

U.S. PATENT DOCUMENTS

| | | | |
|---|---|---|---|
| 2013/0224541 A1* | 8/2013 | Nam | H01M 2/1016 |
| | | | 429/90 |
| 2015/0111083 A1 | 4/2015 | Kim et al. | |
| 2016/0006085 A1* | 1/2016 | Toya | H01M 10/48 |
| | | | 429/90 |
| 2016/0134000 A1 | 5/2016 | Lee et al. | |
| 2016/0197323 A1* | 7/2016 | DeKeuster | H01M 2/305 |
| | | | 429/82 |

FOREIGN PATENT DOCUMENTS

| | | |
|---|---|---|
| EP | 2 833 436 A1 | 2/2015 |
| GB | 2081495 A | 2/1982 |
| JP | 54-28030 U | 2/1979 |
| JP | S5632373 U | 3/1981 |
| JP | 61-196461 U | 12/1986 |
| JP | 63-32455 U | 3/1988 |
| JP | 2013-105723 A | 5/2013 |
| KR | 20-1994-0025572 U | 11/1994 |
| KR | 10-1174045 B1 | 8/2012 |
| KR | 10-1285712 B1 | 7/2013 |
| KR | 10-1512088 B1 | 4/2015 |
| KR | 10-2015-0136842 A | 12/2015 |
| WO | WO 2014/155903 A1 | 10/2014 |
| WO | WO 2015/016564 A1 | 2/2015 |

* cited by examiner

BATTERY PACK

TECHNICAL FIELD

The present disclosure relates to a battery pack, and more particularly, to a battery pack which may be easily moved since a handle rod is combined to the battery pack.

The present application claims priority to Korean Patent Application No. 10-2016-0002620 filed on Jan. 8, 2016 in the Republic of Korea, the disclosure of which is incorporated herein by reference.

BACKGROUND ART

According to technical development and an increase in demands regarding mobile devices, demands for secondary batteries as an energy source are rapidly increasing. Generally, nickel cadmium batteries or hydrogen ion batteries have been used as secondary batteries, but recently, lithium secondary batteries that have very low self-discharge rates, have high energy densities, and are freely charged and discharged because a memory effect is barely generated compared to nickel-based secondary batteries are widely used.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery case, that seals and accommodates the electrode assembly with an electrolyte.

The lithium secondary battery includes a positive electrode, a negative electrode, a separator disposed therebetween, and an electrolyte, and is classified into a lithium ion battery (LIB), a polymer lithium ion battery (PLIB), or the like based on which positive electrode active material and negative electrode active material are used. Generally, an electrode of the lithium secondary battery is formed by coating the positive or negative electrode active material on a current collector, such as an aluminum or copper sheet, a mesh, a film, a foil, or the like, and then drying the positive or negative electrode active material.

Generally, the secondary battery has a module structure as unit cells are stacked on each other, and such a plurality of modules may be stacked on each other to form a battery pack. The battery pack may be used as an energy storage device, and is configured to prevent risks caused by external physical factors and to satisfy installation environments or installation conditions. Such a battery pack is usable for various purposes, for example, domestic use or industrial use, and if required, the battery pack may be transported or moved to a predetermined space to be used. In this case, the battery pack needs a handle for easiness of transportation or movement.

DISCLOSURE

Technical Problem

Accordingly, the present disclosure is directed to providing a battery pack which may be easily moved since a handle rod is combined to the battery pack.

Also, the present disclosure is directed to providing a battery pack in which space utility efficiency is increased since a handle rod is embedded inside a case to be prevented from interfering with another object.

Also, the present disclosure is directed to providing a battery pack in which a top cover is easily combined to or separated from a handle rod by a hook protrusion.

Technical Solution

In one aspect of the present disclosure, there is provided a battery pack including: a battery module including a plurality of battery cells; a case accommodating a plurality of the battery modules; and a handle rod embedded in the case.

Also, the handle rod may be provided in a pair to be each combined to the case.

Also, the handle rod may be formed in a round rod shape.

Also, a grip groove for gripping the handle rod may be formed on the case.

Also, the battery pack may further include a top cover combined to the handle rod.

Also, a hook protrusion for combining with the handle rod may be formed on the top cover.

Also, the hook protrusion may include: a rod accommodating portion configured to accommodate the handle rod; and an extending portion extending from the rod accommodating portion.

Also, the hook protrusion may be formed of an elastic material capable of elastic deformation.

Also, a grip groove for gripping the handle rod may be formed on the case, and a cover portion extending from the top cover to close the grip groove may be provided.

Meanwhile, in another aspect of the present disclosure, there is also provided a vehicle including the battery pack.

Advantageous Effects

According to embodiments of the present disclosure, a battery pack may be easily moved through a handle rod since the handle rod is combined to the battery pack.

Also, space utility efficiency may be increased since the handle rod is embedded inside a case to be prevented from interfering with another object.

Also, a top cover may be easily combined to or separated from the handle rod without a separate locking member since a hook protrusion is formed on the top cover and the hook protrusion is combined to the handle rod.

MODE FOR DISCLOSURE

Figure 1:
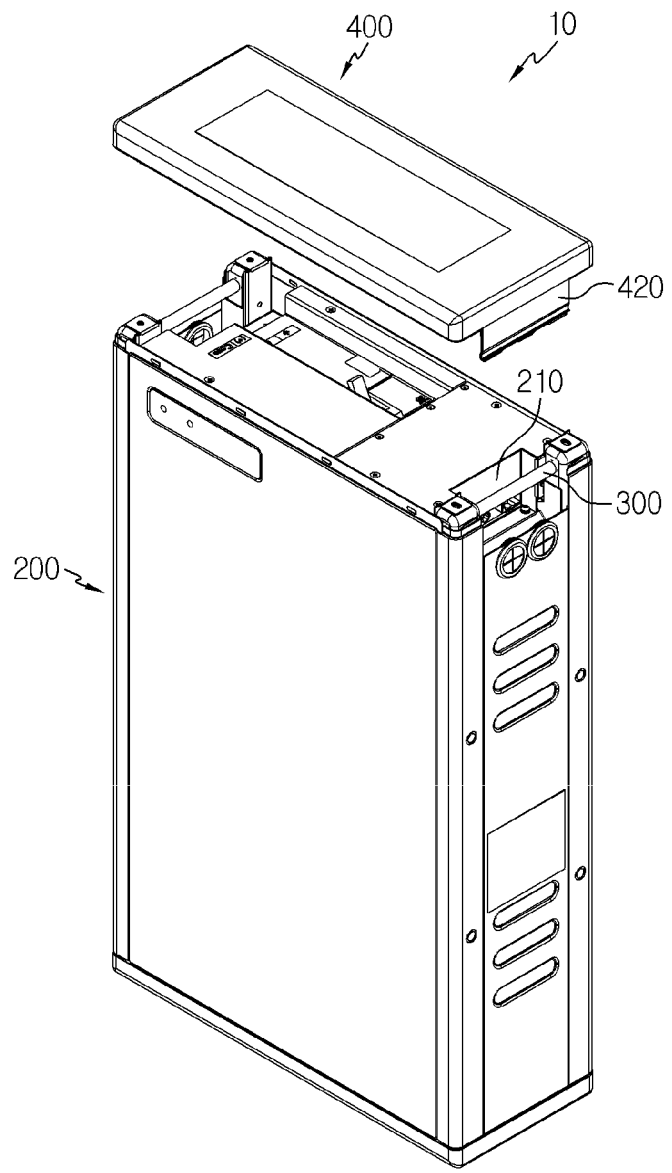
FIG. 1 is a schematic perspective view of a top cover separated from a battery pack, according to an embodiment of the present disclosure.

Hereinafter, a battery pack according to preferred embodiments of the present disclosure will be described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, for convenience of description and clarity, each component or a size of a certain part forming the component may be exaggerated, omitted, or schematically illustrated. Accordingly, the size of each component does not fully reflect the actual size. In the description of the present disclosure, certain detailed explanations of related art are omitted when it is deemed that they may unnecessarily obscure the essence of the disclosure.

The term 'combined' or 'connected' used in the present specification includes not only a case where one member is directly combined or directly connected to another member, but also a case where one member is indirectly combined or indirectly connected to another member via a connecting member.

Figure 2:
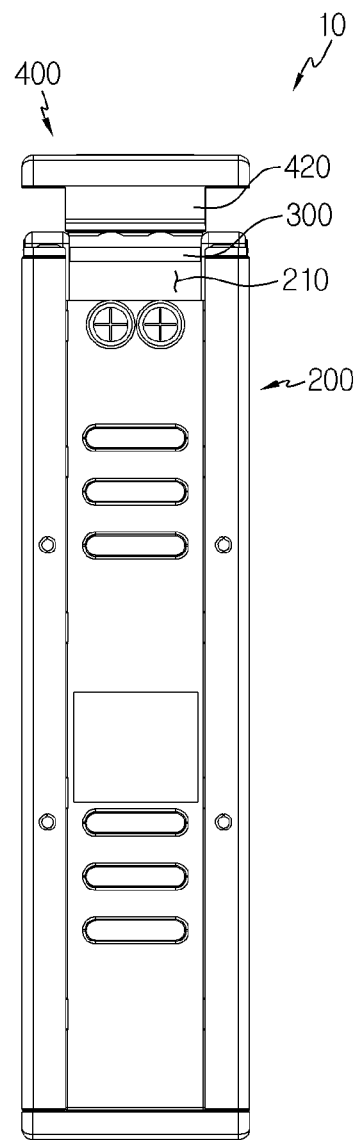
FIG. 2 is a schematic side view of a top cover separated from a battery pack, according to an embodiment of the present disclosure.
Figure 3:
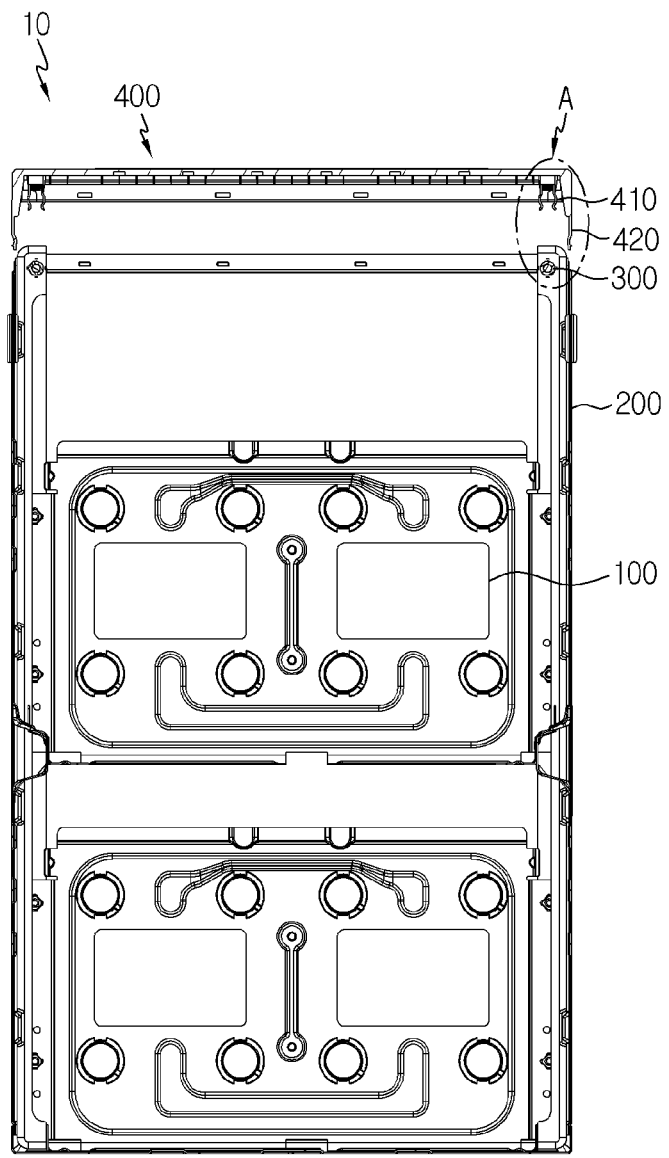
FIG. 3 is a cross-sectional view of a top cover separated from a battery pack, according to an embodiment of the present disclosure.
Figure 4:
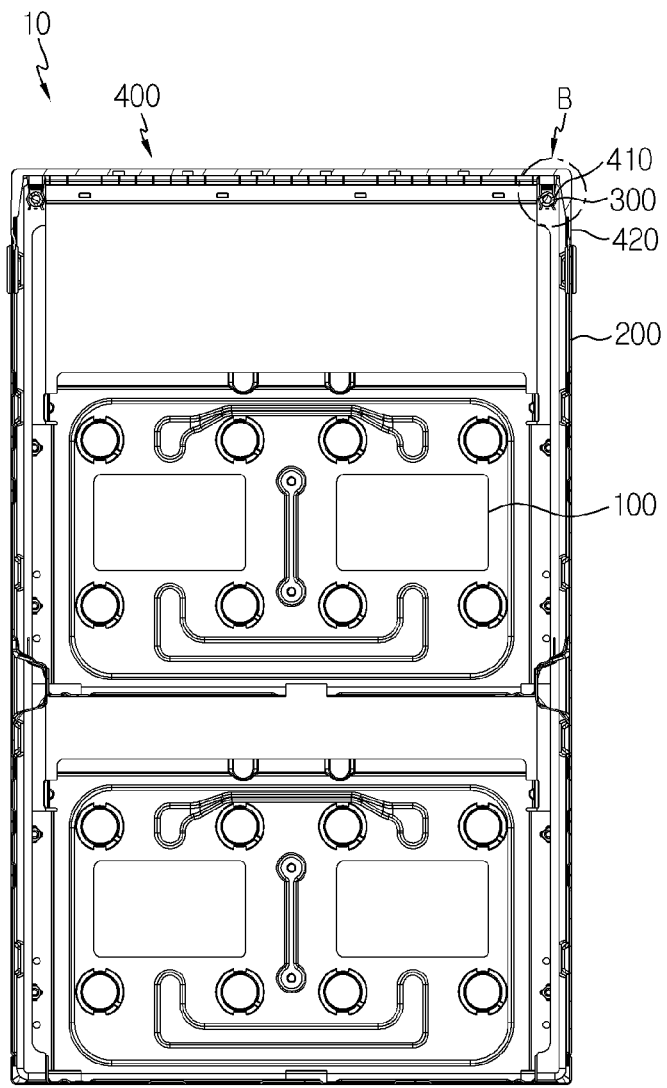
FIG. 4 is a cross-sectional view of a top cover combined to a battery pack, according to an embodiment of the present disclosure.

FIG. 1 is a schematic perspective view of a top cover separated from a battery pack, according to an embodiment of the present disclosure, FIG. 2 is a schematic side view of a top cover separated from a battery pack, according to an embodiment of the present disclosure, FIG. 3 is a cross-sectional view of a top cover separated from a battery pack, according to an embodiment of the present disclosure, and FIG. 4 is a cross-sectional view of a top cover combined to a battery pack, according to an embodiment of the present disclosure.

Referring to FIGS. 1 through 4, in a battery pack 10 according to an embodiment of the present disclosure, a plurality of battery modules 100 are stacked on each other, a case 200 accommodates and protects the stacked plurality of battery modules 100, and a handle rod 300 is combined to the case 200 for easiness of transportation or movement. Also, the battery pack 10 may include various devices for controlling charging or discharging of the battery module 100, such as a battery management system (BMS), a current sensor, a fuse, etc.

The battery module 100 may include a plurality of battery cells. The battery cell may have a structure in which a plurality of unit cells arranged in an order of positive electrode plate-separator-negative electrode plate or bi-cells arranged in an order of positive electrode plate-separator-negative electrode plate-separator-positive electrode plate-separator-negative electrode plate are stacked on each other according to battery capacity. Also, the battery cell may include an electrode lead. The electrode lead is a type of terminal externally exposed to be connected to an external device, and may be formed of a conductive material. The electrode leads may include a positive electrode lead and a negative electrode lead. The positive electrode lead and the negative electrode lead may be provided in opposite directions with respect to a length direction of the battery cell, or the positive electrode lead and the negative electrode lead may be located in the same direction with respect to the length direction of the battery cell. Meanwhile, the battery module 100 may include a plurality of cartridges accommodating the battery cells. Each cartridge may be manufactured via injection molding of plastic, and the plurality of cartridges having an accommodating portion in which the battery cell is accommodated may be stacked on each other. A cartridge assembly in which the plurality of cartridges are stacked on each other may include a connector element or a terminal element. The connector element may include, for example, an electric connection part or a connection part of any shape to be connected to a BMS (not shown) for providing data regarding a voltage or temperature of the battery cell. Also, the terminal element includes a positive electrode terminal and a negative electrode terminal as a main terminal connected to the battery cell, and the terminal element may be electrically connected to the outside by including a terminal bolt.

The case 200 may accommodate one or more battery modules 100. In other words, at least one battery module 100 is stacked inside the case 200, and the case 200 surrounds and protects the battery module 100. In other words, the case 200 surrounds the entire battery module 100 and accordingly protects the battery module 100 from external vibration or impact. The case 200 may have a shape corresponding to a shape of the battery module 100. For example, when an overall shape of the stacked battery modules 100 is hexahedron, the case 200 may also have a corresponding hexahedron shape. The case 200 may be manufactured by, for example, bending a plate of a metal material, and accordingly, the case 200 may be integrally manufactured. Here, when the case 200 is integrally manufactured, a combining process may be easy and simple. Alternatively, the case 200 may be manufactured as a separated type, and the cases 200 may be combined by using one of various methods, such as a welding method, a rivet method, a bolt method, a pin method, a bracket method, a moment connection method, etc.

Meanwhile, a grip groove 210 for gripping the handle rod 300 described below may be formed on the case 200. In other words, the handle rod 300 formed as a round rod may be embedded inside the case 200, and at this time, the grip groove 210 on which a hand or an operator is put such that the operator easily hold the handle rod 300 may be formed on the case 200.

The handle rod 300 is embedded in the case 200, and may be used as a handle while the battery pack 10 is moved. Also, referring to FIG. 1, the handle rod 300 may be provided in a pair to be each combined to the case 200. In other words, the pair of handle rods 300 may respectively be combined to two end portions of the case 200. The handle rod 300 has a round rod shape of a cylindrical shape, in which a cross-section is circular, and the handle rod 300 having the round rod shape does not protrude outside the case 200 by being combined to the case 200 to be embedded inside the case 200. Conventionally, an externally protruding handle bumped into and interfered with a wall, another battery pack 10, or the like, and thus an extra space for the externally protruding handle needed to be obtained, and accordingly, space utility efficiency was low. However, in the battery pack 10 according to an embodiment of the present disclosure, the handle rod 300 is embedded inside the case 200 and thus does not interfere with another object, and accordingly, space utility efficiency is increased.

Figure 5:
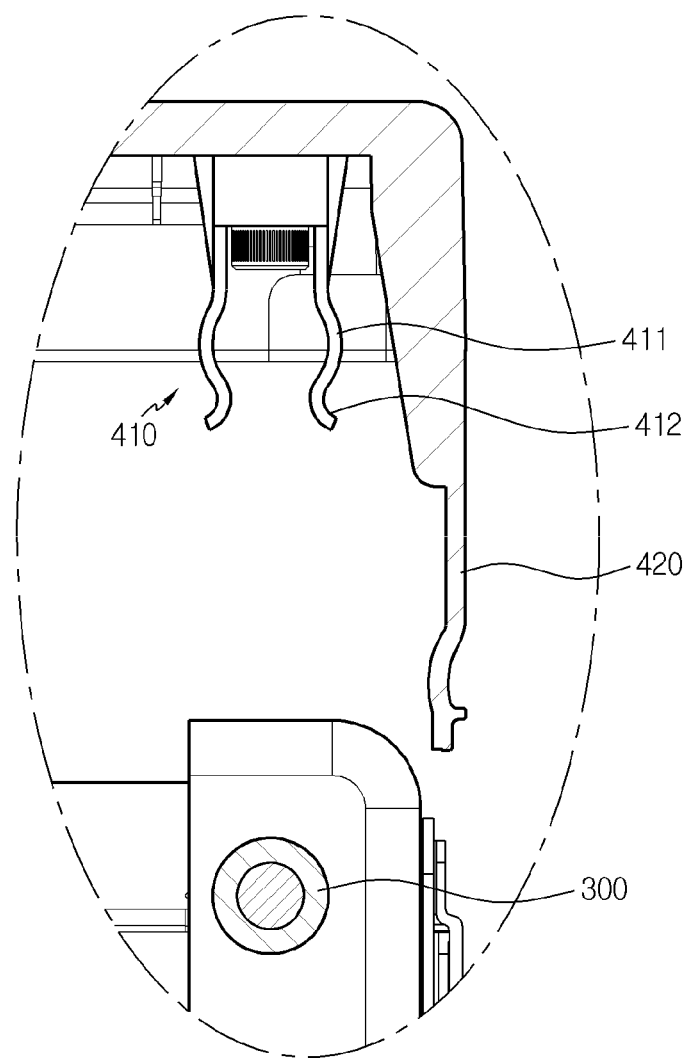
FIG. 5 is an enlarged view of a region A of FIG. 3.
Figure 6:
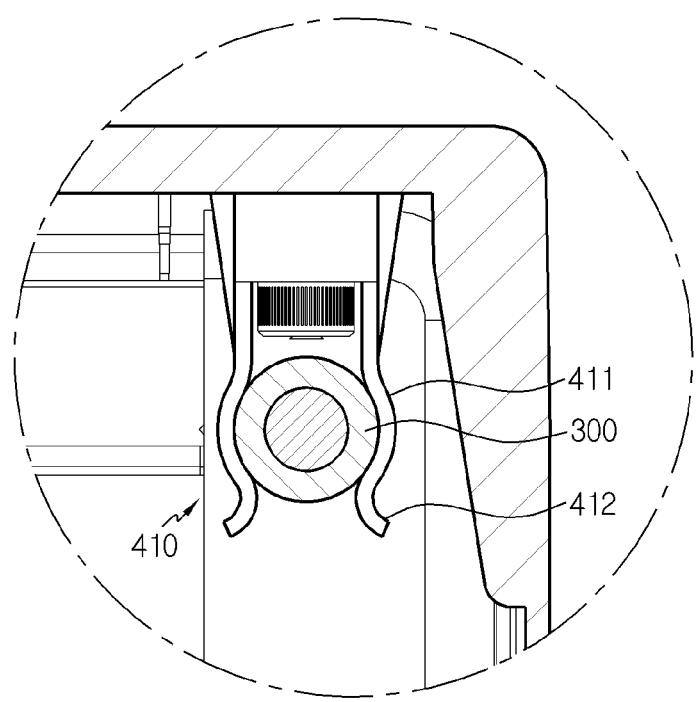
FIG. 6 is an enlarged view of a region B of FIG. 4.
Figure 7:
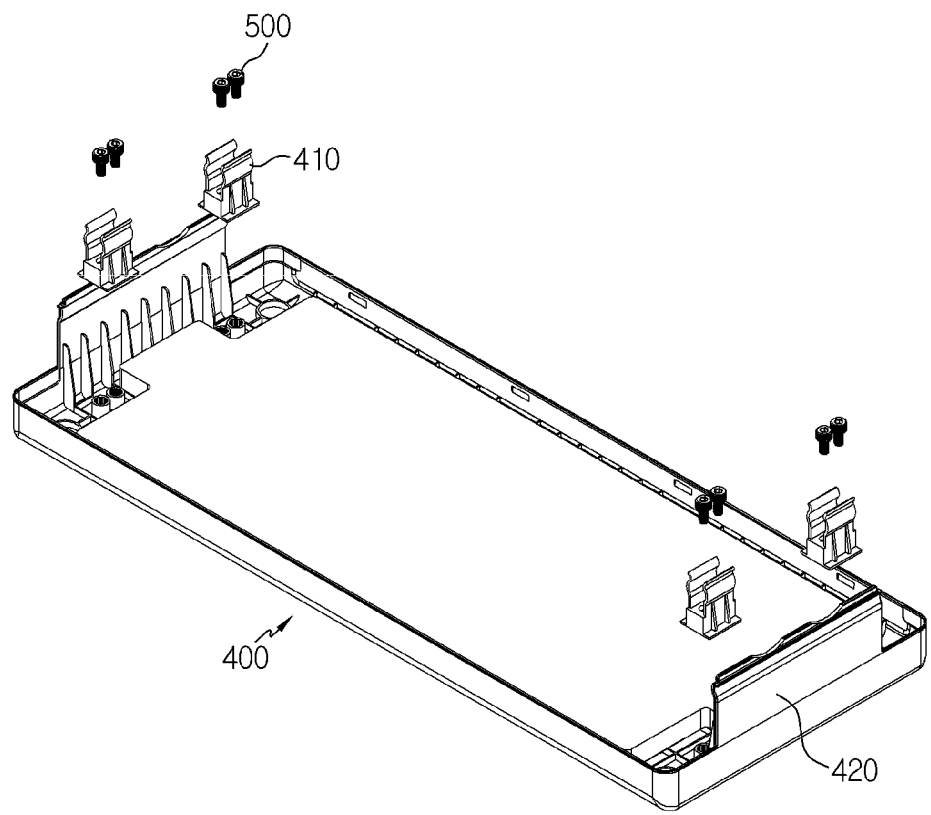
FIG. 7 illustrates a bottom surface of a top cover from which a hook protrusion is separated in a battery pack, according to an embodiment of the present disclosure.

FIG. 5 is an enlarged view of a region A of FIG. 3, FIG. 6 is an enlarged view of a region B of FIG. 4, and FIG. 7 is a view of a bottom surface of a top cover from which a hook protrusion is separated in a battery pack, according to an embodiment of the present disclosure.

Referring to FIGS. 3 through 6, a top cover 400 is combined to the handle rod 300 to seal the case 200, and protects the battery modules 100 inside the case 200. Here, a hook protrusion 410 is formed on the top cover 400 to be combined to the handle rod 300. When the case 200 is manufactured by bending a plate of a metal material, in particular, a steel material, the top cover 400 may be combined to the case 200 by a locking member, such as a bolt and a nut. However, when the top cover 400 and the case 200 are coupled by using the bolt and the nut, it is not easy to separate the top cover 400 and the case 200 from each other. Specifically, when the battery pack 10 is to be moved by holding the handle rod 300 embedded inside the case 200 after separating the top cover 400 from the case 200, the bolt and the nut need to be released whenever the battery pack 10 is moved, which is not easy, is inconvenient, and consumes time. Accordingly, in the battery pack 10 according to an embodiment of the present disclosure, the hook protrusion 410 is formed on the top cover 400 and is combined to the handle rod 300, and thus the top cover 400 may be easily combined to the handle rod 300 without having to use a separate locking member, such as a bolt and a nut, and in addition, the top cover 400 may be easily separated from the handle rod 300. Also, when the top cover 400 is separated from the handle rod 300, the battery pack 10 may be moved by using the handle rod 300 embedded inside the case 200. However, a method of coupling the top cover 400 and the case 200 by using a bolt and a nut is not completely excluded in the battery pack 10 according to the current embodiment, and for example, the top cover 400 and the case 200 may be combined by using a bolt and a nut when there is low possibility that the battery pack 10 may be transported and moved by being fixed for a long period of time after being moved to a predetermined location.

Referring to FIGS. 5 and 6, the hook protrusion 410 may include a rod accommodating portion 411 and an extending portion 412. The handle rod 300 may be inserted into and accommodated in the rod accommodating portion 411. The rod accommodating portion 411 may have a shape corresponding to a cross-section of the handle rod 300 so as to accommodate the handle rod 300. In other words, when the cross-section of the handle rod 300 is circular, the rod accommodating portion 411 may be substantially prepared to include a circular shape. Also, the extending portion 412 extends from the rod accommodating portion 411 such that the handle rod 300 is easily inserted into the rod accommodating portion 411. In other words, when the handle rod 300 first contacts the extending portion 412, the rod accommodating portion 411 and the extending portion 412 of the hook protrusion 410 are pressurized, and at this time, when the rod accommodating portion 411 and the extending portion 412 are formed of an elastic material, the rod accommodating portion 411 and the extending portion 412 are elastically deformed and opened such that the handle rod 300 is inserted into and accommodated in the rod accommodating portion 411. Accordingly, the top cover 400 may be easily combined to or separated from the handle rod 300.

Referring to FIG. 7, the hook protrusion 410 may be prepared in a separated type, and combined to the top cover 400 by using a coupling bolt 500. However, a method of combining the hook protrusion 410 to the top cover 400 is not limited thereto, and the hook protrusion 410 and the top cover 400 may be integrally manufactured via injection molding. Also, in FIG. 7, four hook protrusions 410 are illustrated, but the number of hook protrusions 410 is not limited thereto.

Referring to FIGS. 1 and 7, a cover portion 420 extends from the top cover 400, and is prepared to close the grip groove 210 described above. In other words, the cover portion 420 prevents foreign substances, such as fine dust, from entering the inside through the grip groove 210, and also prevents the handle rod 300 and the hook protrusion 410 from being damaged from an external impact. The cover portion 420 may be variously formed, and specifically, may be integrally manufactured with the top cover 400 via injection molding.

Hereinafter, operations and effects of the battery pack 10 according to an embodiment of the present disclosure will be described.

The battery pack 10 includes the case 200 accommodating the battery module 100 so as to protect the battery module 100, and the handle rod 300 is combined to the case 200 for convenience and easiness of transportation or movement of the battery pack 10. Here, the handle rod 300 is embedded in the case 200 so as to prevent the handle rod 300 from interfering with another object, such as a wall, another battery pack 10, or the like.

Meanwhile, the top cover 400 having the hook protrusion 410 is provided to protect the battery module 100 accommodated in the case 200, and the top cover 400 may be combined to or separated from the handle rod 300 via the hook protrusion 410. In other words, when the battery pack 10 is transported or moved, the top cover 400 is separated from the handle rod 300 by using the hook protrusion 410, and then the operator transports or moves the battery pack 10 by holding the handle rod 300. Also, when the battery pack 10 is done being transported or moved, the top cover 400 is combined to the handle rod 300 by using the hook protrusion 410.

Meanwhile, a vehicle (not shown) according to an embodiment of the present disclosure may include the battery pack 10 described above, and the battery pack 10 may include the battery module 100. Also, the battery pack 10 according to an embodiment of the present disclosure may be applied to the vehicle (not shown), for example, a predetermined vehicle (not shown) prepared to use electricity, such as an electric car or a hybrid car.

While the present disclosure has been described with reference to limited embodiments and drawings, the present disclosure is not limited thereto, and various changes and modifications within the technical ideas of the present disclosure and the equivalent scope of the appended claims will become apparent to those skilled in the art from this detailed description.

INDUSTRIAL APPLICABILITY

The present disclosure relates to a battery pack, and in particular, is usable in industries related to secondary batteries.

What is claimed is:
1. A battery pack comprising:
a battery module comprising a plurality of battery cells;
a case, the case having a top wall, a bottom wall, a pair of opposed side walls perpendicular to the top wall and a pair of opposed end walls forming an enclosure, the top wall joined to a first sidewall at a first edge;

a plurality of the battery modules accommodated in the enclosure;

a grip groove formed in the first sidewall of the case and extending downwardly from the top wall, the grip groove having a top edge in the top wall, the top edge spaced inwardly from the first edge, and a bottom edge formed in the first sidewall, the bottom edge spaced downwardly from the first edge;

a handle rod embedded in the case and extending across the grip groove; and a top cover on the top wall of the case, wherein the top cover comprises a cover portion extending downwardly from a side edge of the top cover and a hook protrusion extending from a bottom surface of the top cover, the hook protrusion engaging the handle rod to secure the top cover to the case, wherein the hook protrusion is formed of an elastic material capable of elastic deformation and has a shape conforming to the handle rod, and wherein a first portion of the hook protrusion is spaced from the cover portion and between the cover portion and the handle rod.

2. The battery pack of claim 1, wherein the handle rod is provided in a pair to be each combined to the case.

3. The battery pack of claim 1, wherein the handle rod is formed in a round rod shape.

4. The battery pack of claim 1, wherein the hook protrusion comprises:

a rod accommodating portion configured to accommodate the handle rod; and an extending portion extending from the rod accommodating portion.

5. A vehicle comprising the battery pack according to claim 1.

6. The battery pack of claim 1, wherein a width of the grip groove is less than a width of the first sidewall.

7. The battery pack of claim 1, wherein the cover portion has a width less than a width of the first sidewall of the case.

8. The battery pack of claim 1, wherein the handle rod is spaced inwardly from the first sidewall of the case.

9. The battery pack of claim 1, wherein the hook portion has a second portion spaced from the first portion, and wherein the rod is retained between the first portion and second portion.

10. The battery pack of claim 9, wherein the hook portion has an accommodating portion and an extending portion, the extending portion being further from the bottom surface of the top cover than the accommodating portion, and wherein a width of the accommodating portion is greater than a width of the extending portion.

* * * * *